(12) United States Patent
Yamauchi et al.

(10) Patent No.: US 11,025,178 B2
(45) Date of Patent: Jun. 1, 2021

(54) ACTUATOR DEVICE

(71) Applicant: DENSO CORPORATION, Kariya (JP)

(72) Inventors: Takuma Yamauchi, Kariya (JP); Eitaro Tanaka, Kariya (JP); Haruhiko Watanabe, Kariya (JP); Goro Ueda, Kariya (JP); Seiichiro Washino, Kariya (JP)

(73) Assignee: DENSO CORPORATION, Kariya (JP)

( * ) Notice: Subject to any disclaimer, the term of this patent is extended or adjusted under 35 U.S.C. 154(b) by 114 days.

(21) Appl. No.: 16/351,997

(22) Filed: Mar. 13, 2019

(65) Prior Publication Data

US 2019/0214924 A1 Jul. 11, 2019

Related U.S. Application Data

(63) Continuation of application No. PCT/JP2017/030189, filed on Aug. 23, 2017.

(30) Foreign Application Priority Data

Sep. 20, 2016 (JP) .............................. JP2016-183297
Mar. 29, 2017 (JP) .............................. JP2017-065134

(51) Int. Cl.
*H02N 10/00* (2006.01)
*F03G 7/00* (2006.01)
*F03G 7/06* (2006.01)

(52) U.S. Cl.
CPC .............. *H02N 10/00* (2013.01); *F03G 7/00* (2013.01); *F03G 7/065* (2013.01); *F05C 2251/08* (2013.01)

(58) Field of Classification Search
CPC ........ H02N 10/00; H02N 3/00; H02N 11/006; F03G 7/065; F03G 7/00; G01N 25/56; F05C 2251/08

(Continued)

(56) References Cited

U.S. PATENT DOCUMENTS 4,699,314 A * 10/1987 Faurie .................. F16K 31/002
 137/875
2010/0057038 A1 * 3/2010 Rush ....................... F04B 51/00
 604/500

(Continued)

FOREIGN PATENT DOCUMENTS

JP 2008111882 A 5/2008
JP 2015206331 A 11/2015
JP 2016042783 A 3/2016

OTHER PUBLICATIONS

Haines et al., "Artificial Muscles from Fishing Line and Sewing Thread", DOI: 10.1126/science.1246906, Feb. 21, 2014, vol. 343, Science, www.sciencemag.org, pp. 868-872.

*Primary Examiner* — Ahmed Elnakib
(74) *Attorney, Agent, or Firm* — Harness, Dickey & Pierce, P.L.C.

(57) ABSTRACT

An actuator device includes an actuator member, a drive subject, a drive device, and a tension applicator. The actuator member is configured to be deformed in response to application of energy to the actuator member from an outside of the actuator member. The drive subject is coupled to the actuator member. The drive device is configured to apply the energy to the actuator member and thereby displace the drive subject in a deforming direction of the actuator member. The tension applicator is configured to apply the actuator member a tension, which enables correction of a tension change generated by at least one of elongation and contraction of the actuator member that is induced by natural deformation of the actuator member.

2 Claims, 15 Drawing Sheets

(58) Field of Classification Search
USPC .......................................................... 310/306
See application file for complete search history.

(56) References Cited

U.S. PATENT DOCUMENTS

2014/0060036 A1* 3/2014 Gao ..................... F01P 7/10
60/527
2015/0219078 A1   8/2015 Li et al.

* cited by examiner

ACTUATOR DEVICE

CROSS REFERENCE TO RELATED APPLICATIONS

This application is a continuation application of International Patent Application No. PCT/JP2017/030189 filed on Aug. 23, 2017, which designated the United States and claims the benefit of priority from Japanese Patent Application No. 2016-183297 filed on Sep. 20, 2016 and Japanese Patent Application No. 2017-065134 filed on Mar. 29, 2017. The entire disclosures of all of the above applications are incorporated herein by reference.

TECHNICAL FIELD

The present disclosure relates to an actuator device.

BACKGROUND

Previously, there is known an actuator device that uses an actuator member (deformable actuator member) as a power source while the actuator member is configured to be deformed in response to application of energy to the actuator member from an outside by an electrical means, a photonic means, a chemical means, a thermal means, absorbing means or another means.

SUMMARY

According to the present disclosure, there is provided an actuator device that includes a deformable actuator member and a drive subject. The deformable actuator member is configured to be deformed in response to application of energy to the deformable actuator member from an outside of the deformable actuator member. The drive subject is coupled to the deformable actuator member.

BRIEF DESCRIPTION OF DRAWINGS

The present disclosure, together with additional objectives, features and advantages thereof, will be best understood from the following description in view of the accompanying drawings.

DETAILED DESCRIPTION

Figure 1:
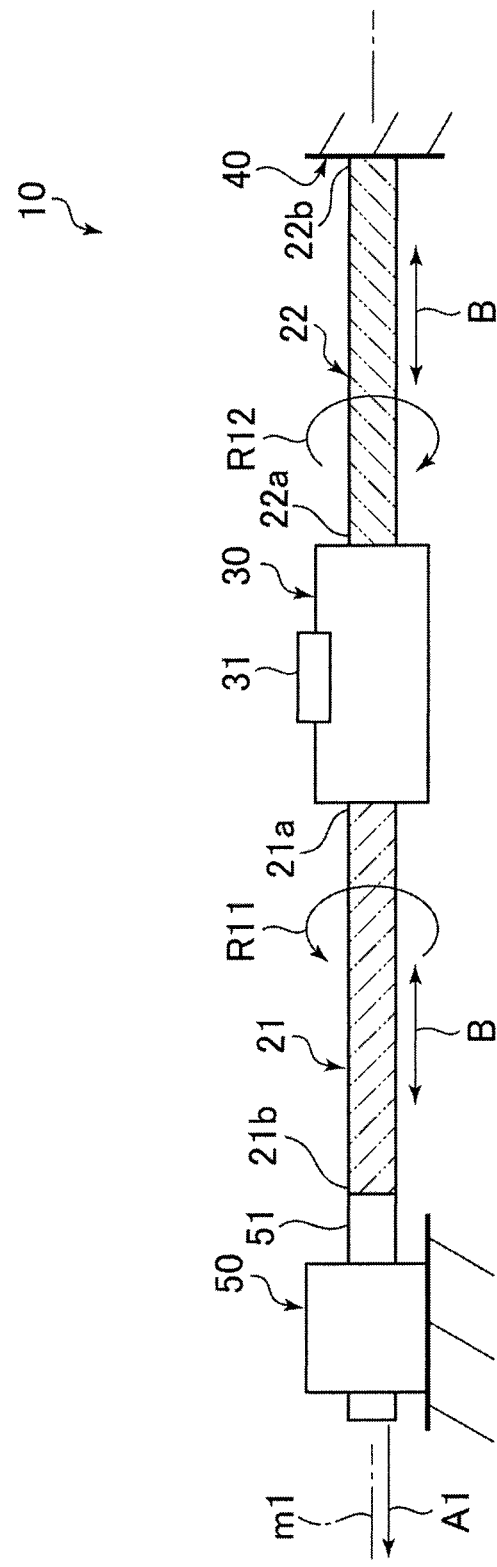
FIG. 1 is a diagram schematically showing a structure of an actuator device according to a first embodiment.

An actuator member of the previously known actuator device has a characteristic of that the actuator member is torsionally deformed or is elongated in response to a temperature change caused by electric heating or heating by a white-light lamp.

When the actuator member is cooled by natural cooling after heating of the actuator member, the actuator member is deformed in an opposite direction that is opposite from a deforming direction of the actuator member deformed at the time of heating the actuator member. Therefore, when the actuator member is heated and is cooled in a state where a drive subject is coupled to the actuator member, the drive subject can be reciprocated.

In contrast, in the case of the actuator member, which is made of the polymer fibers, the actuator member may be swelled by absorbing water and/or oil present in the surrounding environment, and thereby a deformation characteristic, such as a torsional deformation characteristic and an elongation characteristic, of the actuator member may possibly be changed. Also, in a case where the actuator member is deformed by continuously applying a constant load to the actuator member, i.e., in a case where the actuator member undergoes creep deformation, the deformation characteristic of the actuator member may be changed. When the actuator member is deformed by the swelling, the creep deformation, the thermal expansion or the thermal contraction, the operation of the drive subject coupled to the actuator member may be changed. Thereby, the operation of the drive subject may possibly become unstable.

The above issue is not limited to the actuator member made of the polymer fibers but is common to various actuator devices that use the actuator member as a drive source of the actuator device while the actuator member has the deformation characteristic that can be changed by the natural deformation (e.g., the swelling, the creep deformation, the thermal expansion, thermal contraction).

An actuator device according to one aspect of the present disclosure includes a deformable actuator member, a drive subject, a drive device and a tension applicator. The deformable actuator member is configured to be deformed in response to application of energy to the deformable actuator member from an outside of the deformable actuator member. The drive subject is coupled to the deformable actuator member. The drive device is configured to apply the energy to the deformable actuator member and thereby displace the drive subject in a deforming direction of the deformable actuator member. The tension applicator is configured to apply the deformable actuator member a tension, which enables correction of a tension change generated by at least one of elongation and contraction of the deformable actuator member that is induced by natural deformation of the deformable actuator member.

With this construction, even under the circumstances where the deformable actuator member is likely elongated and/or contracted by the natural deformation, a tension change of the deformable actuator member is corrected by the tension that is applied from the tension applicator to the deformable actuator member. In this way, at least one of the elongation and the contraction of the deformable actuator member induced by the natural deformation will have less influence on the operation of the drive subject, and thereby the operation of the drive subject can be stabilized.

Hereinafter, various embodiments of the present disclosure will be described with reference to the drawings. In the following embodiments, substantially identical parts are indicated by the same reference signs and will not be described redundantly for the sake of simplicity.

First Embodiment

Hereinafter, an actuator device according to a first embodiment will be described with reference to the drawings. In order to facilitate the understanding of the description, the same reference signs are attached to the same constituent elements in each drawing as much as possible, and redundant explanations of these elements are omitted.

As shown in FIG. 1, the actuator device 10 of the present embodiment includes a first deformable actuator member (hereinafter, simply referred to as a first actuator member) 21, a second deformable actuator member (hereinafter, simply referred to as a second actuator member) 22, a drive subject 30, a fixation member 40 and a tension application device 50. The first actuator member 21 and the second actuator member 22 respectively serve as a deformable actuator member.

The first actuator member 21 and the second actuator member 22 are connected in series while the drive subject 30 is interposed between the first actuator member 21 and the second actuator member 22. Each actuator member 21, 22 is made of a member in a form of a wire that is placed along an axis m1. Each actuator member 21, 22 is made of polymer fibers, such as polyamide fibers. A metal plating, such as a silver plating, is formed at a surface of each actuator member 21, 22. Each actuator member 21, 22 can be heated by conducting an electric current through the metal plating formed at the surface of the actuator member 21, 22. Each actuator member 21, 22 has a characteristic of being torsionally deformable about the axis m1 in response to application of heat energy to the actuator member 21, 22 through heating.

Specifically, as indicated by dot-dot-dash lines in the drawing, an orientation direction of polyamide molecules, which are constituent molecules of the first actuator member 21, is a spiral direction that is spiral about the axis m1 while the spiral direction is tilted relative to the axis m1 by a predetermined angle. Thereby, the first actuator member 21 has the following torsionally deforming characteristic. Specifically, the first actuator member 21 is torsionally deformed in a first direction R11 about the axis m1 in response to application of the heat energy to the first actuator member 21 through the heating and is torsionally deformed in an opposite direction that is opposite from the first direction R11 upon cooling of the first actuator member 21 through, for example, natural cooling. Specifically, the deforming direction of the first actuator member 21 is the first direction R11.

In contrast, an orientation direction of polyamide molecules, which are constituent molecules of the second actuator member 22, is a spiral direction that is spiral about the axis m1 while the spiral direction is tilted in an opposite direction, which is opposite from the orientation direction of the polyamide molecules of the first actuator member 21, relative to the axis m1 by the predetermined angle. In this way, the second actuator member 22 is torsionally deformed in a second direction R12, which is opposite from the first direction R11, in response to the application of the heat energy to the second actuator member 22 through the heating and is torsionally deformed in the opposite direction, which is opposite from the second direction R12, upon cooling of the second actuator member 22 through, for example, the natural cooling. Specifically, the deforming direction of the second actuator member 22 is the second direction R12. A shape of a cross section of the second actuator member 22 and a length of the second actuator member 22 are the same as a shape of a cross section of the first actuator member 21 and a length of the first actuator member 21.

In the drawings described hereinafter, indication of the orientation direction of each actuator member is omitted unless otherwise mentioned.

The drive subject 30 is coupled to an end part 21a of the first actuator member 21. Therefore, when the first actuator member 21 is torsionally deformed in the first direction R11, a rotational force is applied to the drive subject 30 in the first direction R11. Thereby, the drive subject 30 is rotationally displaced in the first direction R11.

The drive subject 30 is also coupled to an end part 22a of the second actuator member 22. Therefore, when the second actuator member 22 is torsionally deformed in the second direction R12, a rotational force is applied to the drive subject 30 in the second direction R12. Thereby, the drive subject 30 is rotationally displaced in the second direction R12.

A sensor device 31 is fixed to the drive subject 30. The sensor device 31 is, for example, a device, which senses a required physical quantity, or an image capturing device. The sensor device 31 is configured to be rotationally displaced in the first direction R11 and the second direction R12 together with the drive subject 30. The drive subject 30 is supported by a support mechanism (not shown) in a manner that enables rotation of the drive subject 30 about the axis m1.

The fixation member 40 is, for example, a housing of the actuator device 10. An end part 22b of the second actuator member 22, which is opposite from the end part 22a of the second actuator member 22 coupled to the drive subject 30, is fixed to the fixation member 40. The fixation member 40 holds the second actuator member 22.

The tension application device 50 is a device that applies a tension to each actuator member 21, 22 in response to application of the electric power to the tension application device 50. The tension application device 50 includes a movable portion 51. An end part 21b of the first actuator member 21, which is opposite from the end part 21a of the first actuator member 21 coupled to the drive subject 30, is coupled to the movable portion 51. The tension application device 50 displaces the movable portion 51 in a direction of an arrow A1 in response to the application of the electric power to the tension application device 50. The direction of the arrow A1 is a direction that is parallel with the axis m1 and is away from the drive subject 30. A tension is applied to each actuator member 21, 22 in the direction of the arrow A1 due to the displacement of the movable portion 51.

Furthermore, the tension, which is applied to each actuator member 21, 22, can be adjusted by adjusting the amount of electric power supplied to the tension application device 50. As discussed above, the tension application device 50 is configured to electrically control the tension to be applied to each actuator member 21, 22. For example, an electromagnetic actuator, which displaces the movable portion 51 by an electromagnetic force, or an electric motor, which displaces the movable portion 51 through use of a rotational force of a rotor thereof, may be used as the tension application device 50.

The tension application device 50 holds the first actuator member 21. The tension application device 50 and the fixation member 40 have a function of holding the drive subject 30 through each actuator member 21, 22.

Next, an electrical structure of the actuator device 10 will be described.

Figure 2:
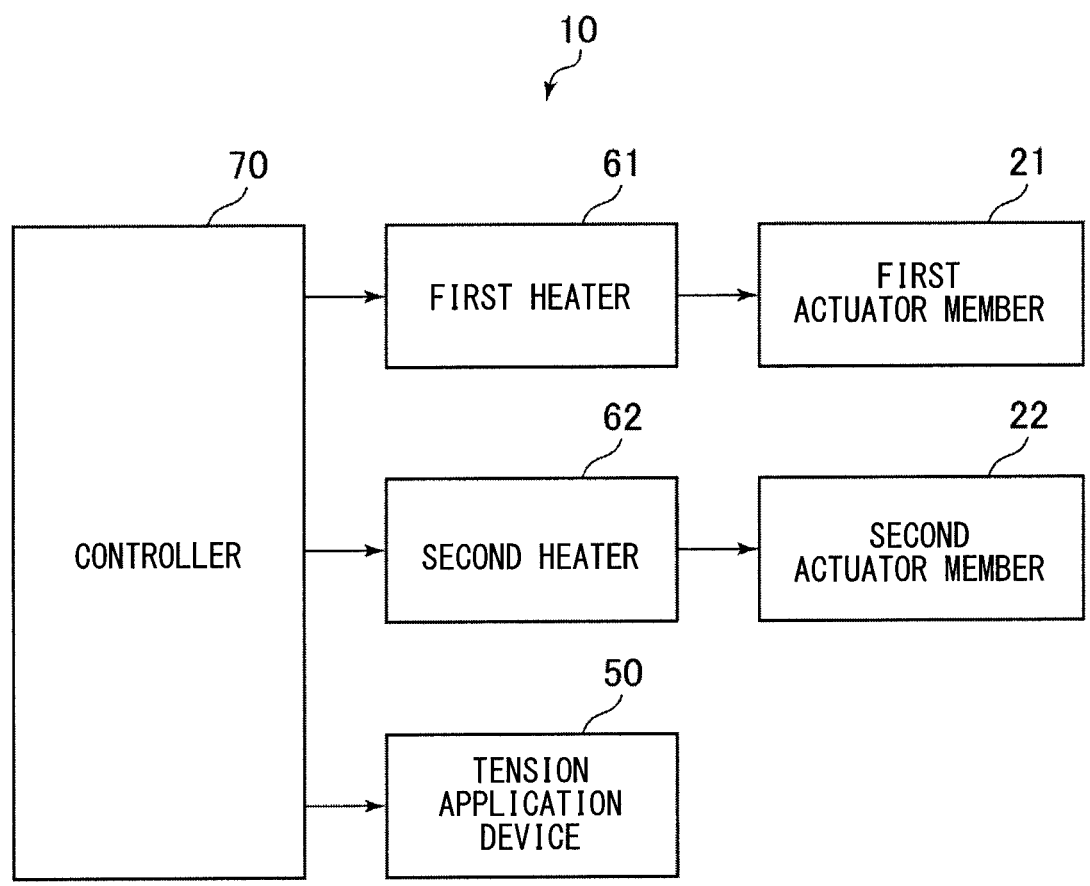
FIG. 2 is a block diagram showing an electrical structure of the actuator device of the first embodiment.

As shown in FIG. 2, the actuator device 10 further includes a first heater (first heating device) 61, a second heater (second heating device) 62 and a controller 70.

The first heater 61 supplies the electric current to the metal plating of the first actuator member 21, so that the first actuator member 21 is heated by Joule heat. In this way, the first actuator member 21 is torsionally deformed in the first direction R11, and thereby the drive subject 30 is rotationally displaced in the first direction R11. As discussed above, the first heater 61 of the present embodiment functions as a drive device that displaces the drive subject 30 in the deforming direction of the first actuator member 21 by applying the energy to the first actuator member 21.

The second heater 62 supplies the electric current to the metal plating of the second actuator member 22, so that the second actuator member 22 is heated by Joule heat. In this way, the second actuator member 22 is torsionally deformed in the second direction R12, and thereby the drive subject 30 is rotationally displaced in the second direction R12. As discussed above, the second heater 62 of the present embodiment functions as a drive device that displaces the drive subject 30 in the deforming direction of the second actuator member 22 by applying the energy to the second actuator member 22.

The controller 70 executes an orientation control operation that changes the orientation of the drive subject 30 in the first direction R11 and the second direction R12 by individually heating the first actuator member 21 and the second actuator member 22 through the first heater 61 and the second heater 62. The controller 70 includes a microcomputer, which includes, for example, a CPU, a ROM and a RAM and serves as a main component of the controller 70. The CPU executes computing processes that relate to the orientation control operation of the drive subject 30. The ROM stores, for example, programs and data required for the orientation control operation. The RAM temporarily stores the computing results of the CPU.

Specifically, in a case of displacing the orientation of the drive subject 30 in the first direction R11, the controller 70 heats the first actuator member 21 through the first heater 61. Furthermore, in a case of displacing the orientation of the drive subject 30 in the second direction R12, the controller 70 heats the second actuator member 22 through the second heater 62.

Furthermore, the controller 70 controls the tension application device 50 to apply the tension to the respective actuator members 21, 22. Specifically, at the time of starting the orientation control operation of the drive subject 30, i.e., at the time of starting the operation of the drive subject 30, the controller 70 supplies the electric power to the tension application device 50. In this way, the tension application device 50 is driven, and thereby a predetermined tension is applied to each actuator member 21, 22. Alternatively, the controller 70 may drive the tension application device 50 immediately before the time of staring the orientation control operation of the drive subject 30, i.e., immediately before the time of starting the operation of the drive subject 30 to apply the predetermined tension to each actuator member 21, 22. The controller 70 maintains the supply of the electric power to the tension application device 50 during the period of executing the orientation control operation of the drive subject 30, so that the controller 70 maintains the state where the predetermined tension is applied to each actuator member 21, 22.

Furthermore, the controller 70 stops the supply of the electric power to the tension application device 50 at the time of terminating the orientation control operation of the drive subject 30, i.e., the time of terminating the operation of the drive subject 30 to release the tension applied to each actuator member 21, 22.

Next, an operation example of the actuator device 10 of the present embodiment will be described.

Figure 3:
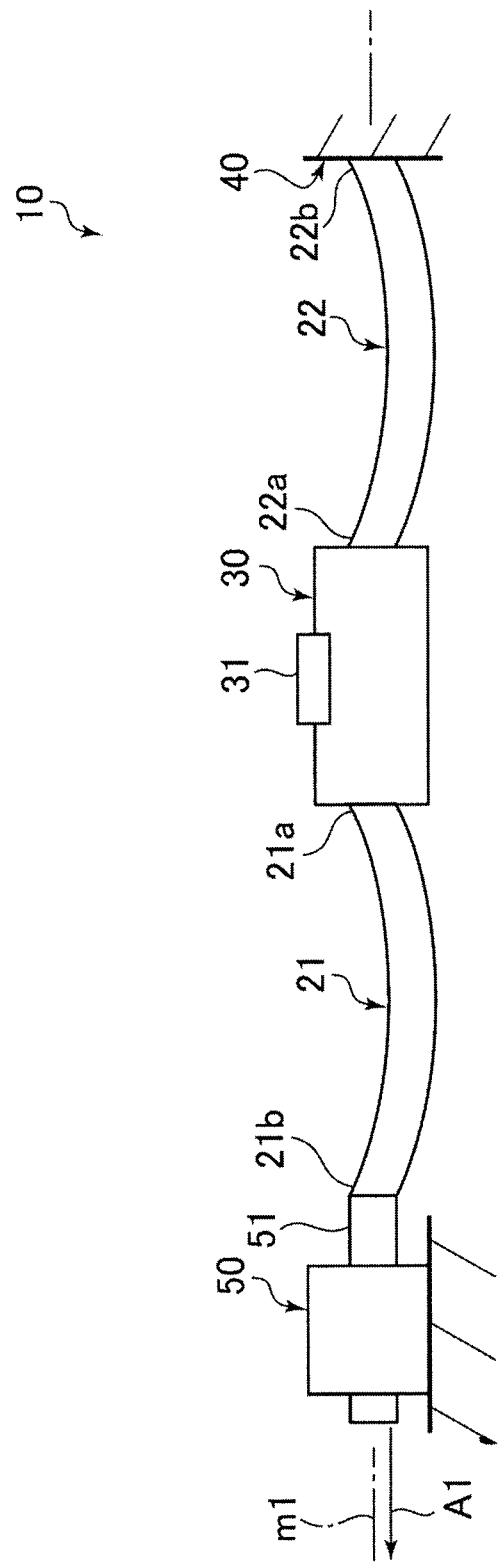
FIG. 3 is a diagram schematically showing an operation example of the actuator device of the first embodiment.

Under circumstances where natural deformation (e.g., swelling, creep deformation, thermal expansion) is likely to occur at each actuator member 21, 22, when each actuator member 21, 22 is elongated in a direction B along the axis m1 shown in FIG. 1, the actuator member 21, 22 may possibly be flexed as shown in FIG. 3. Hereinafter, the direction of the arrow B will be also referred to as an elongating direction of each actuator member 21, 22, the elongation of which is induced by the natural deformation of the actuator member 21, 22. When each actuator member 21, 22 is elongated by the natural deformation, a rotational force, which is generated by a torsional deformation of the actuator member 21, 22, is not likely appropriately applied to the drive subject 30. This causes instability of the operation of the drive subject 30.

With respect to this point, in the actuator device 10 of the present embodiment, even in the case where each actuator member 21, 22 is elongated by the natural deformation in the axial direction of the axis m1, the tension is applied from the tension application device 50 to the first actuator member 21 and the second actuator member 22 in the direction of the arrow A1 at the time of starting the orientation control operation of the drive subject 30 or immediately before the time of starting the orientation control operation of the drive subject 30. Due to this tension applied to the first actuator member 21 and the second actuator member 22, a tension change generated by the elongation of the first actuator member 21 and the second actuator member 22 induced by the natural deformation, is corrected, so that an elongated state of the first actuator member 21 and the second actuator member 22 can be returned to a state shown in FIG. 1. In this way, the rotational force, which is generated by the torsional deformation of each actuator member 21, 22, is appropriately applied to the drive subject 30, so that the drive subject 30 can be appropriately operated.

The actuator device 10 of the present embodiment discussed above can provide the following actions and advantages (1) to (3).

(1) Even under the circumstances where each actuator member 21, 22 is likely elongated by the natural deformation in the axial direction of the axis m1, a tension change, which is generated by the elongation of each actuator member 21, 22 induced by the natural deformation, is corrected by the tension that is applied from the tension application device 50 to each actuator member 21, 22. In this way, the elongation of each actuator member 21, 22 induced by the natural deformation will have less influence on the operation of the drive subject 30, and thereby the operation of the drive subject 30 can be stabilized.

(2) The tension application device 50 applies the tension to each actuator member 21, 22 at the time of starting the operation of the drive subject 30 or immediately before the time of starting the operation of the drive subject 30. Furthermore, the tension application device 50 releases the tension applied to each actuator member 21, 22 at the time of terminating the operation of the drive subject 30 or immediately after the time of terminating the operation of the drive subject 30. In this way, a stress, which is applied to each actuator member 21, 22, is reduced during a period that is other than the period of operating the drive subject 30. Thus, time-related deterioration of the actuator members 21, 22 can be limited.

(3) The tension application device 50 is used as a tension applicator that is configured to electrically control the tension applied to each actuator member 21, 22. Therefore, the amount of tension applied to each actuator member 21, 22 and timing of applying the tension to each actuator member 21, 22 can be freely adjusted by controlling the amount of electric power supplied to the tension application device 50 and the timing of supplying the electric power to the tension application device 50.

Second Embodiment

Next, an actuator device 10 of a second embodiment will be described. Hereinafter, differences with respect to the first embodiment will be mainly described.

Figure 4:
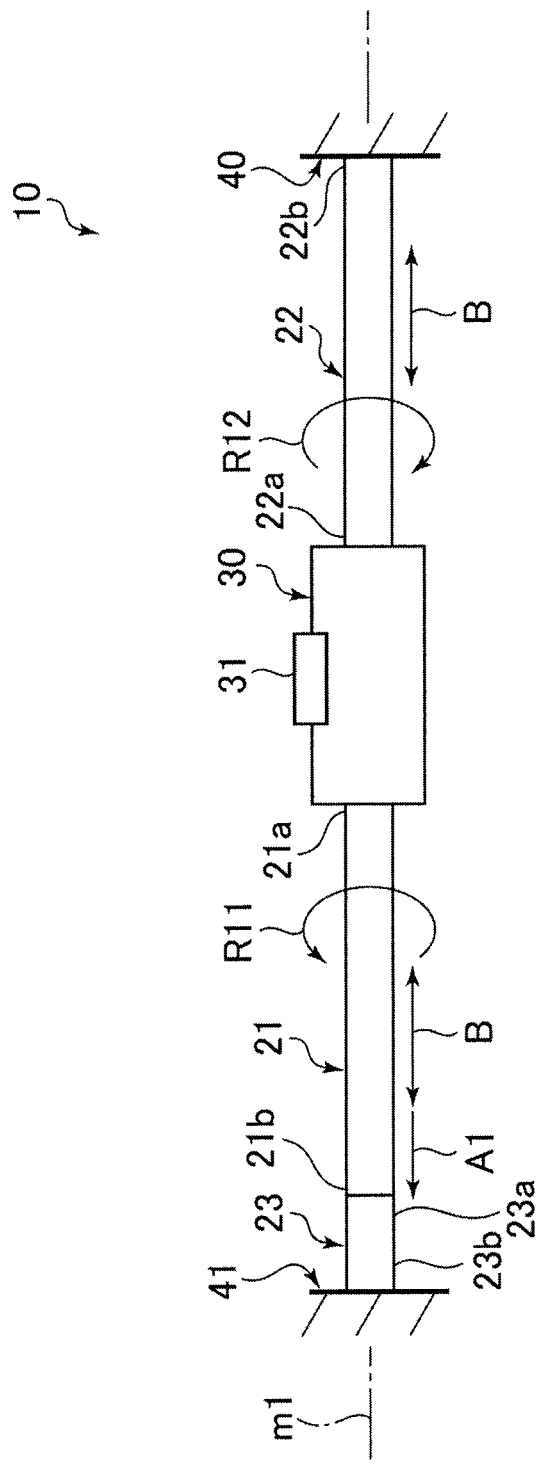
FIG. 4 is a diagram schematically showing a structure of an actuator device according to a second embodiment.

As shown in FIG. 4, the actuator device 10 of the present embodiment includes a correcting actuator member 23 in place of the tension application device 50. The correcting actuator member 23 is made of a member in a form of a wire that is placed along the axis m1. One end part 23a of the correcting actuator member 23 is coupled to the end part 21b of the first actuator member 21. The other end part 23b of the correcting actuator member 23 is fixed to a fixation member 41, such as a housing. The fixation member 41 holds the correcting actuator member 23. The fixation members 40, 41 have a function of holding the drive subject 30 through the respective actuator members 21, 22 and the correcting actuator member 23.

The correcting actuator member 23 is made of a bundle of polymer fibers, such as polyamide fibers. The correcting actuator member 23 is formed integrally with the first actuator member 21 in one piece. Alternatively, the correcting actuator member 23 may be formed separately from the first actuator member 21. In this case, the correcting actuator member 23 is joined to the first actuator member 21 through, for example, bonding.

A metal plating, such as a silver plating, is formed at a surface of the correcting actuator member 23. The metal plating of the correcting actuator member 23 and the metal plating of the first actuator member 21 are electrically insulated from each other. The electric current can be conducted through one of the metal plating of the correcting actuator member 23 and the metal plating of the first actuator member 21. When the electric current is conducted through the metal plating formed at the surface of the correcting actuator member 23, the correcting actuator member 23 is heated. The correcting actuator member 23 has a characteristic of that the correcting actuator member 23 is contracted in the direction B along the axis m1 in response to application of a heat energy to the correcting actuator member 23 through heating.

Figure 5:
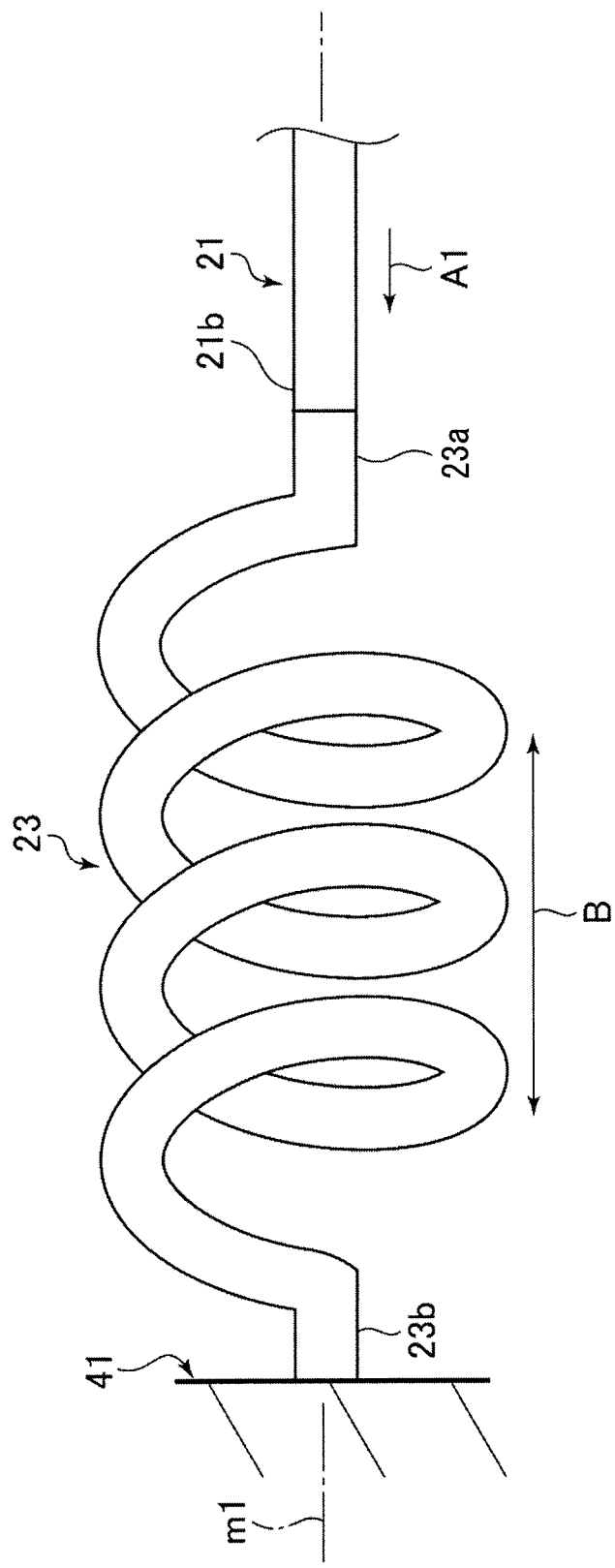
FIG. 5 is an enlarged view showing an example of a correcting actuator member of the second embodiment.

Specifically, as shown in FIG. 5, the correcting actuator member 23 is constructed such that the polymer fibers, which have constituent molecules having an orientation direction set to be a spiral direction, are spirally wound about the axis m1. The polymer fibers of the correcting actuator member 23 has a characteristic of that the polymer fibers are contracted when the polymer fibers are heated. The contraction of the polymer fibers results in the contraction of the whole correcting actuator member 23 in the direction B along the axis m1. The contraction of the correcting actuator member 23 in the direction B along the axis m1 applies a tension to each actuator member 21, 22 in the direction of the arrow A1. The amount of contraction of the correcting actuator member 23 can be adjusted by adjusting the heating amount of the correcting actuator member 23. Thereby, the tension, which is applied to each actuator member 21, 22, can be adjusted.

Next, an electrical structure of the actuator device 10 of the present embodiment will be described.

Figure 6:
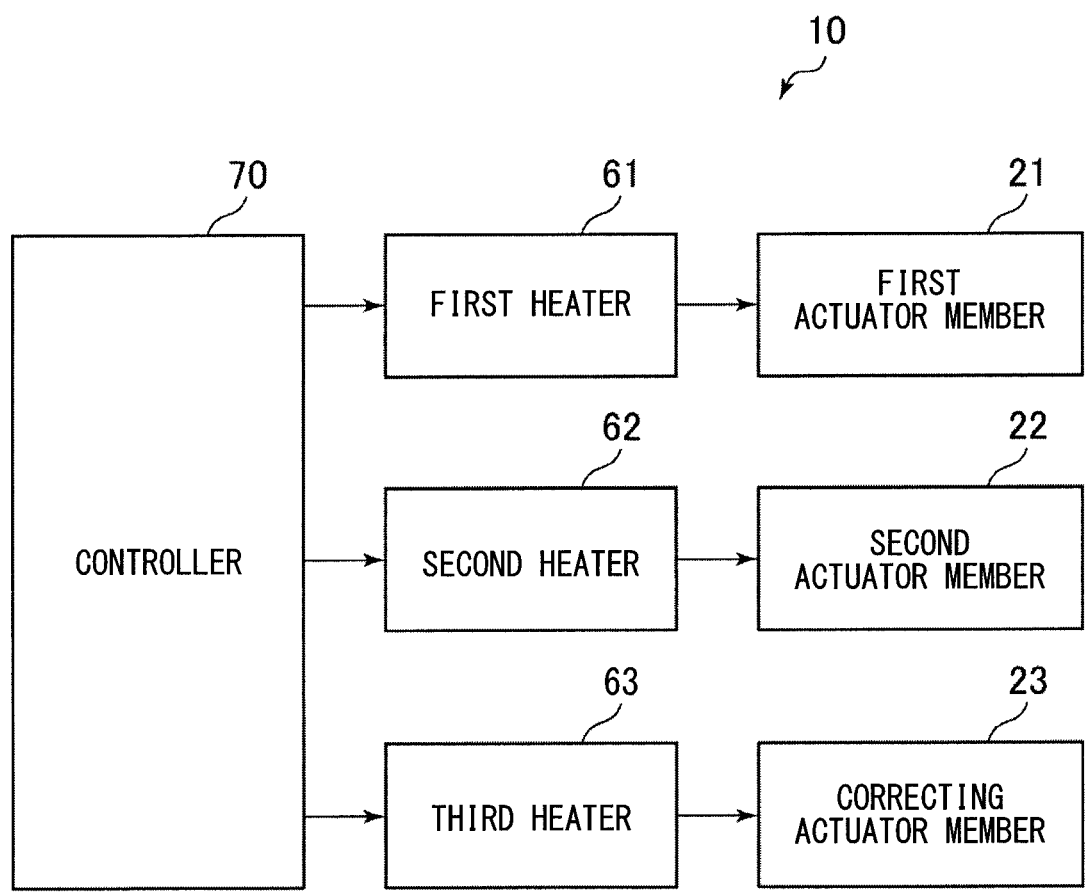
FIG. 6 is a block diagram showing an electrical structure of the actuator device of the second embodiment.

As shown in FIG. 6, the actuator device 10 further includes a third heater 63. The third heater 63 supplies the electric current to the metal plating of the correcting actuator member 23, so that the correcting actuator member 23 is heated by Joule heat. In this way, the correcting actuator member 23 is contracted, and thereby a tension is applied to each actuator member 21, 22. As discussed above, the third heater 63 of the present embodiment functions as a correcting drive device that applies the energy to the correcting actuator member 23.

The controller 70 applies the tension to each actuator member 21, 22 by contracting the correcting actuator member 23 through the third heater 63. Specifically, the controller 70 heats the correcting actuator member 23 at the time of starting the orientation control operation of the drive subject 30, i.e., the time of starting the operation of the drive subject 30 and thereby applies the tension to each actuator member 21, 22. Alternatively, the controller 70 may heat the correcting actuator member 23 immediately before the time of starting the orientation control operation of the drive subject 30, i.e., immediately before the time of starting the operation of the drive subject 30 and thereby apply the predetermined tension to each actuator member 21, 22. The controller 70 maintains the heating of the correcting actuator member 23 during the period of executing the orientation control operation of the drive subject 30, so that the controller 70 maintains the state where the predetermined tension is applied to each actuator member 21, 22.

Furthermore, the controller 70 stops the heating of the correcting actuator member 23 at the time of terminating the orientation control operation of the drive subject 30, i.e., the time of terminating the operation of the drive subject 30 to release the tension applied to each actuator member 21, 22.

The actuator device 10 of the present embodiment discussed above can provide the action(s) and advantage(s), which are the same as or similar to those indicated at the sections (1) and (2) of the first embodiment, and additionally provide the action(s) and advantage(s) indicated at the following section (4).

(4) The correcting actuator member 23 and the third heater 63 are used as the tension applicator that is configured to electrically control the tension applied to each actuator member 21, 22. In this way, the amount of tension applied to each actuator member 21, 22 and timing of applying the tension to each actuator member 21, 22 can be freely adjusted by controlling the heating amount of the correcting actuator member 23 and the timing of the heating the correcting actuator member 23.

Modification

Next, an actuator device 10 of a modification of the second embodiment will be described. Hereinafter, differences with respect to the actuator device 10 of the second embodiment will be mainly described.

Figure 7:
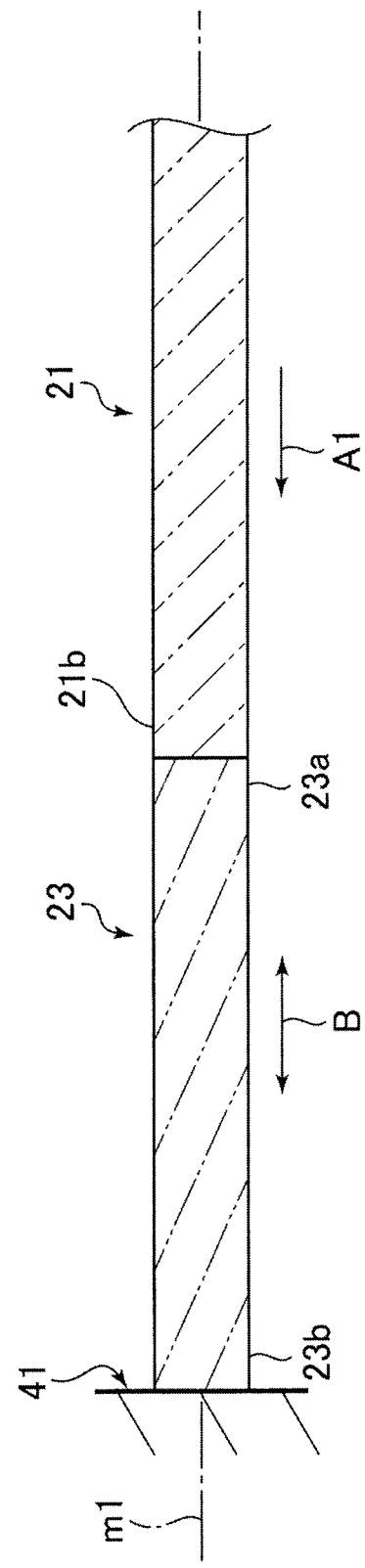
FIG. 7 is an enlarged view showing a correcting actuator member of an actuator device of a modification of the second embodiment.

In the actuator device 10 of the present modification, the correcting actuator member 23 has a structure shown in FIG. 7. Specifically, the correcting actuator member 23 is placed along the axis m1. As indicated by a dot-dot-dash line in FIG. 7, the orientation direction of the polyamide molecules, which are the constituent molecules of the correcting actuator member 23, is a spiral direction that is spiral about the axis m1. A spiral angle of the orientation direction of the correcting actuator member 23 relative to the axis m1 is larger than a spiral angle of the orientation direction of the first actuator member 21 relative to the axis m1. In this way, when the polymer fibers of the correcting actuator member 23 are contracted by the heating, the correcting actuator member 23 is contracted in the axial direction of the axis m1 as a whole. The tension can be applied to each actuator member 21, 22 in the direction of the arrow A1 through the contraction of the correcting actuator member 23 in the axial direction of the axis m1. The tension in the direction of the arrow A1 can be applied to each actuator member 21, 22 through the contraction in the axial direction of the axis m1.

Even in the correcting actuator member 23 discussed above, the action(s) and advantage(s), which are the same as or similar to those indicated at the above sections (1), (2) and (4) of the second embodiment, can be achieved.

Third Embodiment

Next, an actuator device 10 according to a third embodiment will be described. Hereinafter, differences with respect to the actuator device 10 of the first embodiment will be mainly described.

Figure 8:
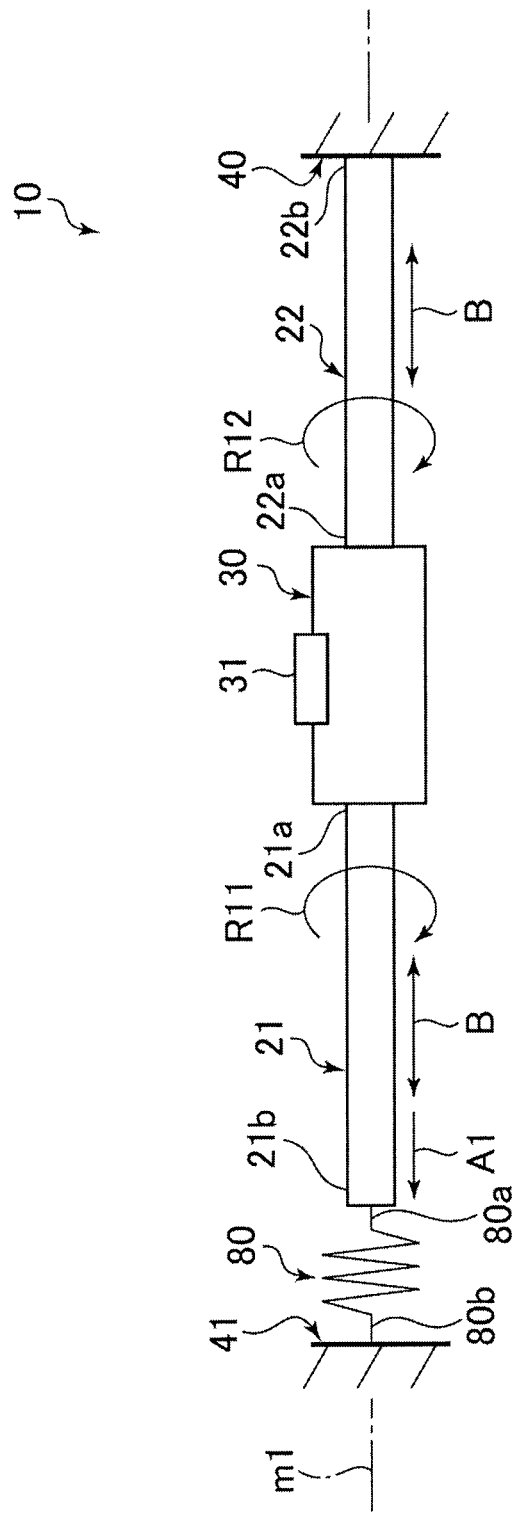
FIG. 8 is a diagram schematically showing a structure of an actuator device according to a third embodiment.

As shown in FIG. 8, the actuator device 10 of the present embodiment includes a resilient member 80 in place of the tension application device 50. The resilient member 80 is connected in series between the first actuator member 21 and the fixation member 41, such as the housing. The resilient member 80 is formed by a coil spring that has an elastic modulus, which is lower than an elastic modulus of each actuator member 21, 22. One end part 80a of the resilient member 80 is coupled to the end part 21b of the first actuator member 21. The other end part 80b of the resilient member 80 is fixed to the fixation member 41 such as the housing.

The resilient member 80 applies a tension in advance to each actuator member 21, 22 in the elongating direction B of the actuator member 21, 22, which is a direction of the elongation of the actuator member 21, 22 inducible by the natural deformation of the actuator member 21, 22. Specifically, the resilient member 80 applies an urging force to the end part 21b of the first actuator member 21 in the direction of the arrow A1. This urging force applies a tension to each actuator member 21, 22 in the direction of the arrow B. The tension, which is applied from the resilient member 80 to each actuator member 21, 22, is set in advance through, for example, an experiment(s) such that each actuator member 21, 22 can be elongated by this tension by the amount that is larger than an amount of elongation of the each actuator member 21, 22 that is inducible by the natural deformation of the actuator member 21, 22.

The actuator device 10 of the present embodiment discussed above can provide the action(s) and advantage(s), which are the same as or similar to those indicated at the section (1) of the first embodiment, and additionally provide the action(s) and advantage(s) indicated at the following sections (5) and (6).

(5) The resilient member 80 is used as the tension applicator that is configured to apply the tension to each actuator member 21, 22. The resilient member 80 applies the tension in advance to each actuator member 21, 22 in the elongating direction B of the actuator member 21, 22, which is the direction of the elongation of the actuator member 21, 22 that is inducible by the natural deformation of the actuator member 21, 22. Thereby, in comparison to the structure, which uses the tension application device 50 of the first embodiment, the tension can be applied to each actuator member 21, 22 by using the simpler structure.

(6) The resilient member 80 applies each actuator member 21, 22 the tension that can elongate each actuator member 21, 22 by the amount, which is larger than the amount of elongation of the actuator member 21, 22 that is inducible by the natural deformation of the actuator member 21, 22. In this way, it is possible to more reliably limit the influence of the elongation of each actuator member 21, 22, which is induced by the natural deformation, on the operation of the drive subject 30.

First Modification

Next, an actuator device 10 of a first modification of the third embodiment will be described. Hereinafter, differences with respect to the actuator device 10 of the third embodiment will be mainly described.

Figure 9:
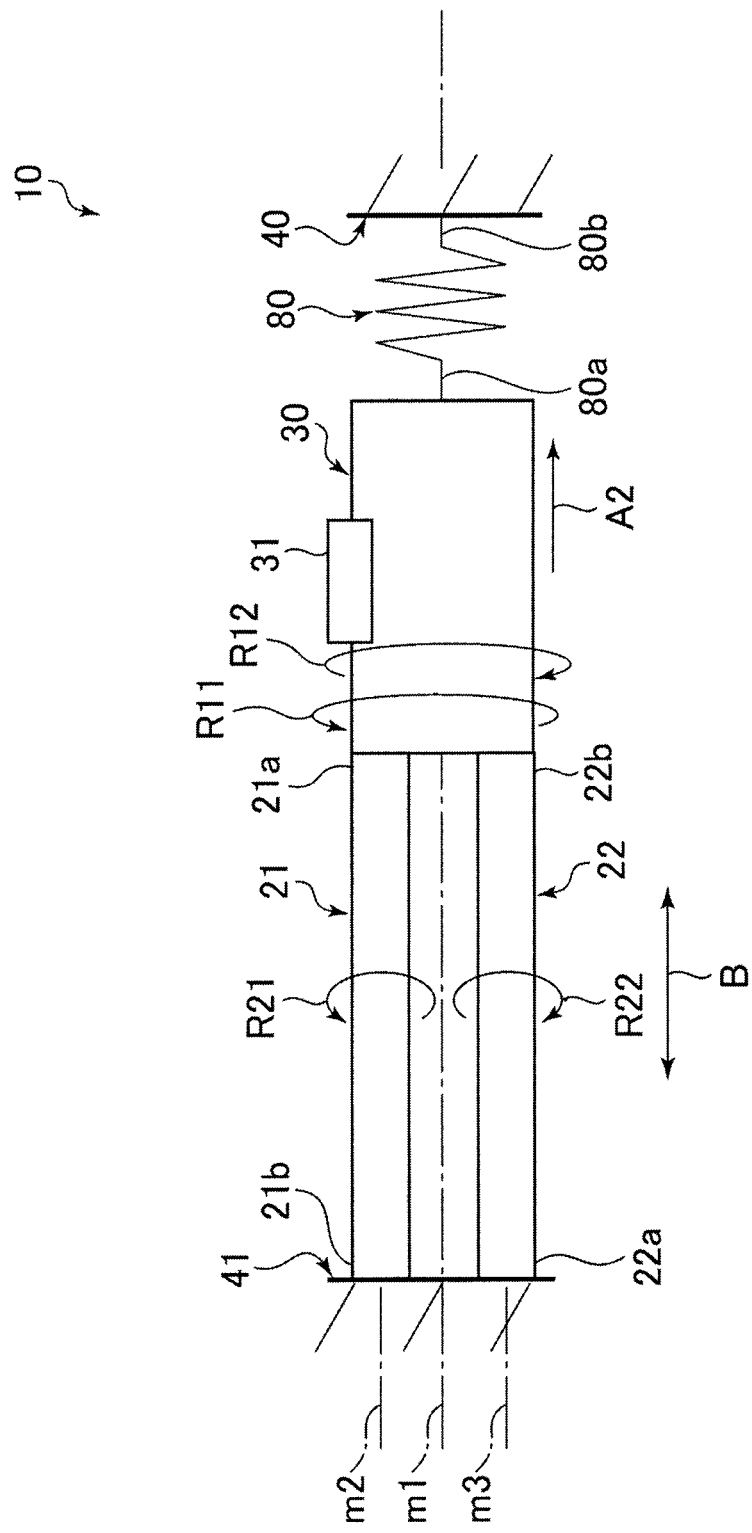
FIG. 9 is a diagram schematically showing a structure of an actuator device of a first modification of the third embodiment.

As shown in FIG. 9, the first actuator member 21 and the second actuator member 22 of the present modification are arranged in parallel while the axis m1 is interposed between the first actuator member 21 and the second actuator member 22. The first actuator member 21 is placed along an axis m2. The first actuator member 21 is torsionally deformed in the rotational direction R21 about the axis m2 in response to the application of the heat energy to the first actuator member 21 through the heating. The second actuator member 22 is placed along an axis m3. The second actuator member 22 is torsionally deformed in a rotational direction R22 about the axis m3 in response to the application of the heat energy to the second actuator member 22 through the heating.

The one end part 21a of the first actuator member 21 and the one end part 22b of the second actuator member 22 are coupled to the drive subject 30. The other end part 21b of the first actuator member 21 and the other end part 22a of the second actuator member 22 are fixed to the fixation member 41. With this structure, when the first actuator member 21 is torsionally deformed in the rotational direction R21 through the heating, a rotational force is applied to the drive subject 30 in the rotational direction R21. The drive subject 30 is rotationally displaced in the first direction R11 by the rotational force applied in the rotational direction R21. Furthermore, when the second actuator member 22 is torsionally deformed in the rotational direction R22 through the heating, a rotational force is applied to the drive subject 30 in the rotational direction R22. The drive subject 30 is rotationally displaced in the second direction R12 by the rotational force applied in the rotational direction R22.

The one end part 80a of the resilient member 80 is coupled to a side surface of the drive subject 30 that is opposite from a side surface of the drive subject 30, to which each actuator member 21, 22 is coupled. The other end part 80b of the resilient member 80 is fixed to the fixation member 40. The resilient member 80 applies a tension in advance to each actuator member 21, 22 in the elongating direction B of the actuator member 21, 22, which is a direction of the elongation of the actuator member 21, 22 inducible by the natural deformation of the actuator member 21, 22. Specifically, the resilient member 80 applies the urging force to the drive subject 30 in a direction of an arrow A2. This urging force applies the tension to each actuator member 21, 22 in the direction of the arrow A2.

The actuator device 10 having the above-described structure can achieve the action(s) and advantage(s), which are the same as or similar to those of the third embodiment.

Second Modification

Next, an actuator device 10 of a second modification of the third embodiment will be described. Hereinafter, differences with respect to the actuator device 10 of the third embodiment will be mainly described.

Figure 10:
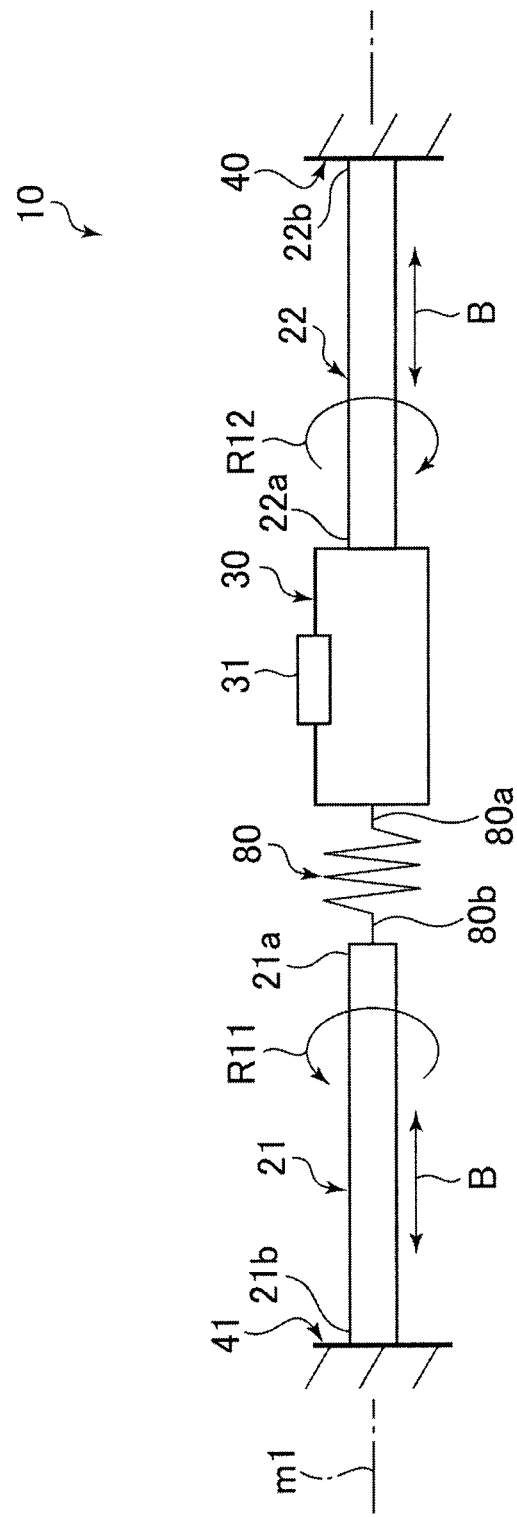
FIG. 10 is a diagram schematically showing a structure of an actuator device of a second modification of the third embodiment.

As shown in FIG. 10, in the actuator device 10 of the present modification, the resilient member 80 is placed between the first actuator member 21 and the drive subject 30. Even with this structure, the action(s) and advantage(s), which are the same as or similar to those of the third embodiment, can be achieved.

Fourth Embodiment

Next, an actuator device 10 according to a fourth embodiment will be described. Hereinafter, differences with respect to the actuator device 10 of the third embodiment will be mainly described. In the present embodiment, the axis m1 will be also referred to as a central axis m1 of the first actuator member 21 and a central axis m1 of the second actuator member 22.

Figure 11:
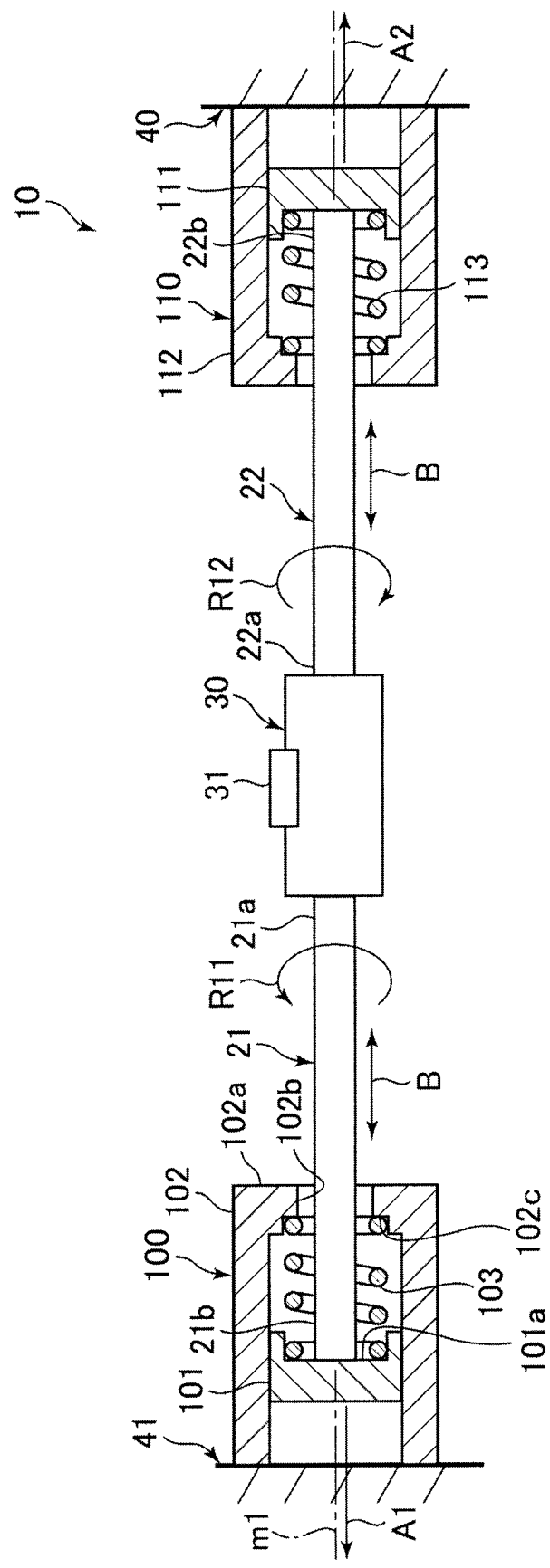
FIG. 11 is a diagram schematically showing a structure of an actuator device according to a fourth embodiment.

As shown in FIG. 11, the actuator device 10 of the present embodiment includes: a first tension application mechanism 100, which is provided to the end part 21b of the first actuator member 21; and a second tension application mechanism 110, which is provided to the end part 22b of the second actuator member 22, in place of the resilient member 80.

The first tension application mechanism 100 applies the tension to the first actuator member 21 in the direction of the arrow A1. Specifically, the first tension application mechanism 100 includes a fixation part 101, a housing 102 and a coil spring 103.

The fixation part 101 is fixed to the end part 21b of the first actuator member 21 by, for example, bonding. The fixation part 101 is shaped into a flange form and projects from an outer peripheral surface of the end part 21b of the first actuator member 21 in a radial direction of the axis m1.

The housing 102 is coaxial with the axis m1 and is shaped into a tubular form having a bottom. The fixation part 101 is slidably received in an inside of the housing 102. The housing 102 has a bottom part 102a at an end part of the housing 102, which is opposed to the drive subject 30. A through hole 102b, which has a central axis that coincides with the axis m1, is formed at the bottom part 102a. The end part 21b of the first actuator member 21 extends into an inside of the housing 102 through the through hole 102b and is fixed to the fixation part 101. An opposite end part of the housing 102, which is opposite from the end part of the housing 102 having the bottom part 102a, is fixed to the fixation member 41. An inner diameter of the through hole 102b is larger than an outer diameter of the first actuator member 21. Therefore, a frictional force is less likely generated between the first actuator member 21 and the housing 102 when the first actuator member 21 is elongated or contracted in the direction B.

The coil spring 103 is placed such that the end part 21b of the first actuator member 21 is received in an inside of the coil spring 103. The coil spring 103 is placed on the radially outer side of the end part 21b of the first actuator member 21 such that the central axis of the coil spring 103 coincides with the central axis m1 of the first actuator member 21. The coil spring 103 is placed in a compressed state at a location between the fixation part 101 and the bottom part 102a of the housing 102, so that the coil spring 103 applies a resilient force to the fixation part 101 in the direction of the arrow A1. In this way, the tension is applied to the first actuator member 21 in the direction of the arrow A1.

One end part of the coil spring 103 is inserted into a recessed groove 101a that is formed at the fixation part 101. The other end part of the coil spring 103 is inserted into a recessed groove 102c that is formed at the housing 102. Since the two end parts of the coil spring 103 are respectively inserted into the grooves 101a, 102c, an outer peripheral portion of the coil spring 103 is held in place. In this way, a gap is formed between an inner peripheral portion of the coil spring 103 and an outer peripheral portion of the first actuator member 21, and a gap is formed between an outer peripheral portion of the coil spring 103 and an inner peripheral portion of the housing 102. Because of the presence of these gaps, at the time of resiliently deforming the coil spring 103, a frictional force is less likely generated between the coil spring 103 and the first actuator member 21, and also a frictional force is less likely generated between the coil spring 103 and the housing 102.

The second tension application mechanism 110 applies the tension to the second actuator member 22 in the direction of the arrow A2, which is opposite from the direction of the arrow A1. Similar to the first tension application mechanism 100, the second tension application mechanism 110 includes a fixation part 111, a housing 112 and a coil spring 113. The structures and the functions of these elements are the same as the structures and the functions of the corresponding elements of first tension application mechanism 100, so that the detailed description of the structures and the functions of these elements will be omitted.

The actuator device 10 of the present embodiment discussed above can provide the action(s) and advantage(s), which are the same as or similar to those indicated at the section (1) of the first embodiment, and additionally provide the action(s) and advantage(s) indicated at the following sections (7) to (9).

(7) Each of the coil springs 103, 113 is used as the tension applicator that applies the tension to the corresponding one of the actuator members 21, 22. The coil spring 103, 113 applies the tension in advance to the corresponding actuator member 21, 22 in the elongating direction B of the actuator member 21, 22, which is the direction of the elongation of the actuator member 21, 22 that is inducible by the natural deformation of the actuator member 21, 22. Thereby, in comparison to the structure, which uses the tension application device 50 of the first embodiment, the tension can be applied to each actuator member 21, 22 by using the simpler structure.

(8) The coil spring 103 is placed on the radially outer side of the first actuator member 21. Furthermore, the coil spring 113 is placed on the radially outer side of the second actuator member 22. Thereby, in comparison to a case where the tension application device 50 is provided to the end part of each of the actuator members 21, 22 like in the first embodiment, it is possible to avoid an increase in the size of the actuator device 10 in the axial direction of the axis m1.

(9) Each of the coil springs 103, 113 receives the corresponding one of the actuator members 21, 22 in the inside of the coil spring 103, 113. In this way, it is possible to avoid an increase in the size of the actuator device 10 in the radial direction of the axis m1.

Modification

Next, an actuator device 10 of a modification of the fourth embodiment will be described. Hereinafter, differences with respect to the actuator device 10 of the fourth embodiment will be mainly described.

Figure 12:
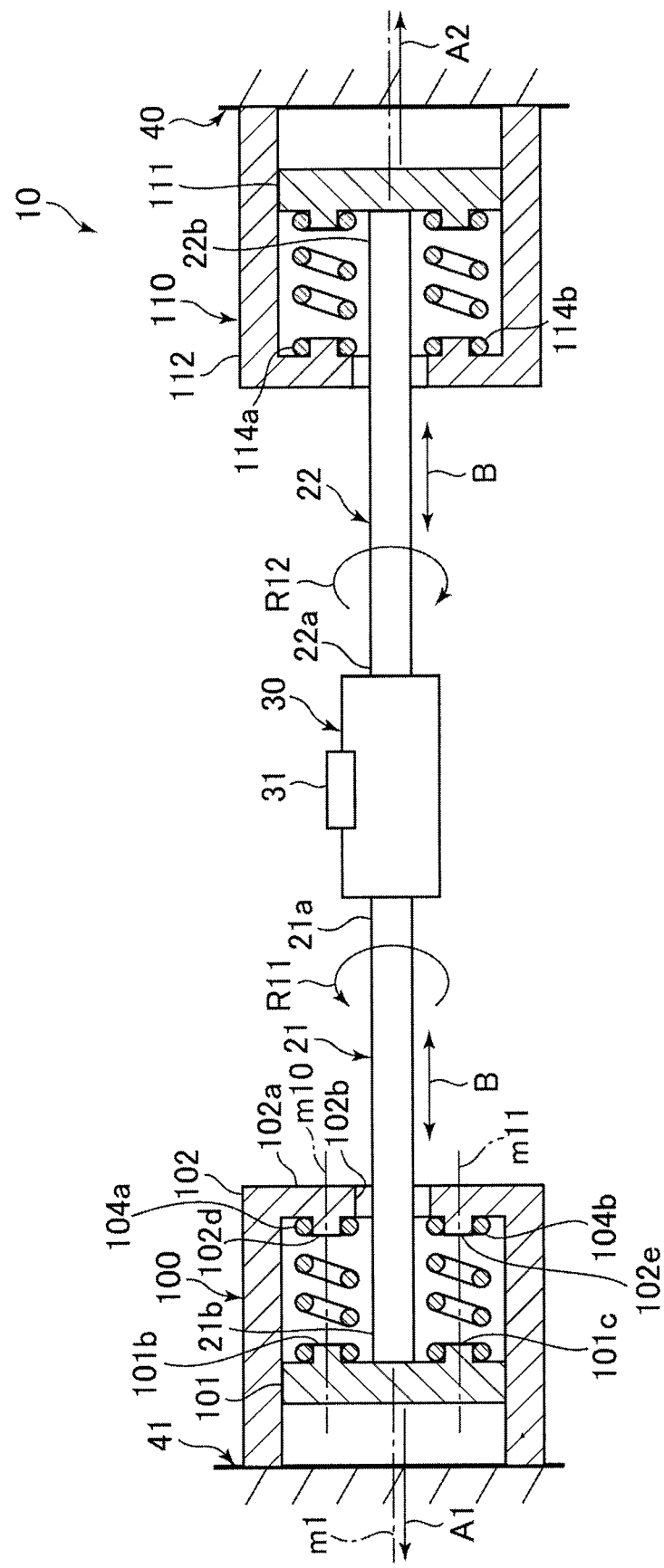
FIG. 12 is a diagram schematically showing a structure of an actuator device according to a modification of the fourth embodiment.
Figure 13:
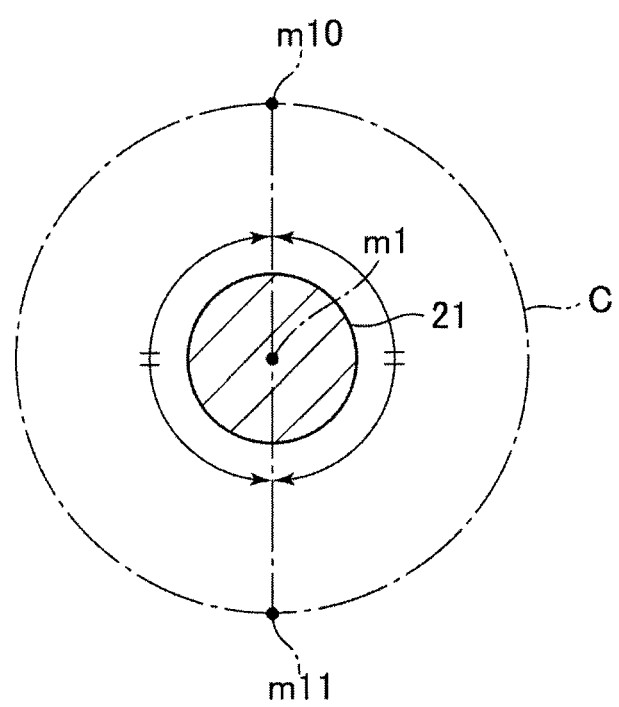
FIG. 13 is a diagram schematically showing a relationship between a central axis m1 of a first actuator member and central axes m10, m11 of coil springs in the actuator device of the fourth embodiment.

As shown in FIG. 12, the first tension application mechanism 100 of the present modification includes two coil springs 104a, 104b. The coil springs 104a, 104b are placed on the radially outer side of the end part 21b of the first actuator member 21 such that a central axis m10, m11 of each of the coil springs 104a, 104b is displaced from the central axis m1 of the actuator member 21. More specifically, as shown in FIG. 13, the central axes m10, m11 of the two coil springs 104a, 104b are arranged one after the other at equal angular intervals along a circle C that is centered at the central axis m1 of the first actuator member 21. In this way, the tension can be applied to the first actuator member 21 in the direction of the arrow A1 without generating a momentum at the first actuator member 21.

As shown in FIG. 12, one end part of the coil spring 104a is fitted to a projection 101b formed at the fixation part 101. Furthermore, the other end part of the coil spring 104a is fitted to a projection 102d formed at the housing 102. When the two end parts of the coil spring 104a are fitted to the projections 101b, 102d, an inner peripheral portion of the coil spring 104a is held in place. Similarly, an inner peripheral portion of the coil spring 104b is held in place by a projection 101c formed at the fixation part 101 and a projection 102e formed at the housing 102. In this way, a gap is formed between the inner peripheral portion of each of the coil springs 104a, 104b and the outer peripheral portion of the first actuator member 21, and a gap is formed between the outer peripheral portion of each of the coil springs 104a, 104b and the inner peripheral portion of the housing 102. Because of the presence of these gaps, at the time of resiliently deforming the coil springs 104a, 104b, a frictional force is less likely generated between the coil spring 104a, 104b and the first actuator member 21, and also a frictional force is less likely generated between the coil spring 104a, 104b and the housing 102.

As shown in FIG. 12, similar to the first tension application mechanism 100, the second tension application mechanism 110 includes two coil springs 114a, 114b. The structures of these coil springs 114a, 114b are the same as the structures of the coil springs 104a, 104b of the first tension application mechanism 100, and thereby detailed description of the coil springs 114a, 114b is omitted.

The actuator device 10 discussed above can provide the action(s) and advantage(s) indicated at the sections (7) and (8) in view of the actuator device 10 of the fourth embodiment. Furthermore, in comparison to the actuator device 10 of the fourth embodiment, the tension, which is applied to each actuator member 21, 22, can be increased by the amount that corresponds to the increase in the number of the coil springs.

Figure 14:
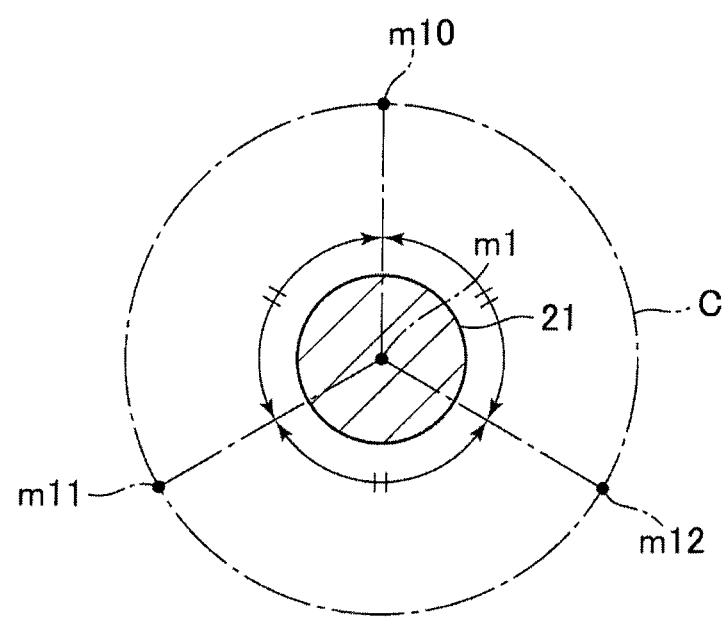
FIG. 14 is a diagram schematically showing a relationship between a central axis m1 of a first actuator member and central axes m10-m12 of coil springs in the actuator device of the fourth embodiment.

The number of the coil springs, which are placed on the radially outer side of each actuator member 21, 22, should not be limited to two and may be changed in an appropriate number. For example, in a case where three coil springs are placed on the radially outer side of the first actuator member 21, as shown in FIG. 14, central axes m10-m12 of the three coil springs are arranged one after the other at equal angular intervals along a common circle C that is centered at the central axis m1 of the first actuator member 21.

Other Embodiments

The above respective embodiments may be modified in the following manner.

The tension application device 50 of the first embodiment may adjust the amount of tension applied to the actuator members 21, 22 such that the amount of tension applied to the actuator member 21, 22 becomes constant. For example, in a case where each of the actuator members 21, 22 has a characteristic of that the actuator member 21, 22 is expanded in the direction B shown in FIG. 1 in response to application of heat to the actuator member 21, 22, the tension application device 50 displaces the movable portion 51 in the direction A1 to maintain a constant amount of tension applied to the actuator member 21, 22 when the actuator member 21 is thermally expanded. In contrast, in a case where each of the actuator members 21, 22 has a characteristic of that the actuator member 21, 22 is contracted in the direction B in response to application of heat to the actuator member 21, 22, the tension application device 50 displaces the movable portion 51 in the opposite direction, which is opposite from the direction A1, to maintain a constant amount of tension applied to the actuator member 21, 22 when the actuator member 21 is thermally contracted. In this way, even in the case where the actuator members 21, 22 have the characteristic of thermally expanded or thermally contracted, the tension change of the actuator member 21, 22 can be corrected. Here, it should be noted a structure, which is similar the above structure, may be implemented at the actuator device 10 of the second embodiment.

The resilient member 80 of the third embodiment should not be limited to the coil spring. A spiral torsion spring, a flat spring or any other appropriate resilient member may be used as the resilient member 80 of the third embodiment. Also, the number of the resilient member 80 should not be limited to one. Specifically, a plurality of resilient members 80 may be used.

In the actuator device 10 of the third embodiment, even if each of the actuator members 21, 22 has a characteristic of that the actuator member 21, 22 is contracted in the direction B by the thermal contraction, the stress applied to each actuator member 21, 22 can be alleviated through deformation of the resilient member 80 in the direction B as long as the resilient member 80 is connected to the end part 21b of the actuator member 21. Thus, the durability of the actuator members 21, 22 can be advantageously improved.

In the actuator device 10 of the fourth embodiment, the number of the coils spring(s) and the location of the coil spring(s) may be appropriately changed. For example, in the actuator device 10 of the modification of the fourth embodiment, only one of the coil springs 104a, 104b may be placed on the radially outer side of the first actuator member 21, and only one of the coil springs 114a, 114b may be placed on the radially outer side of the second actuator member 22.

Figure 15:
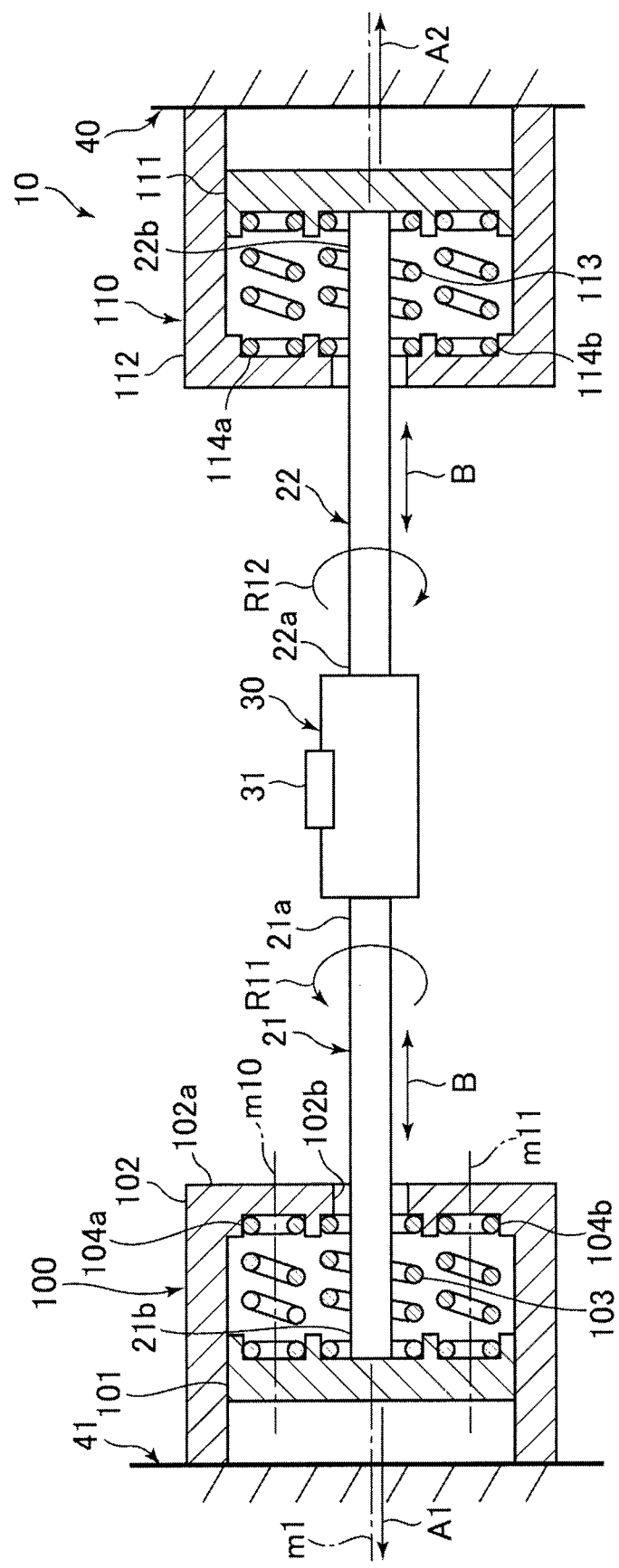
FIG. 15 is a diagram schematically showing a structure of an actuator device according to another embodiment.

Furthermore, as shown in FIG. 15, the arrangement of the coil spring of the actuator device 10 shown in FIG. 11 and the arrangement of the coil springs of the actuator device 10 shown in FIG. 12 may be combined.

In the actuator device 10 of the fourth embodiment, only one of the first tension application mechanism 100 and the second tension application mechanism 110 may be provided.

In the actuator device 10 of the fourth embodiment, in place of each of the coil springs 103, 104a, 104b, 113, 114a, 114b, another type of resilient member, such as a wire mesh spring, may be used.

The inner peripheral portion of the coil spring 103 of the fourth embodiment shown in FIG. 11 may be positioned by the fixation part 101 and the housing 102. This is equally applicable to the coil spring 113. Furthermore, the outer peripheral portion of each of the coil springs 104a, 104b of the modification of the fourth embodiment shown in FIG. 12 may be positioned by the fixation part 101 and the housing 102. This is equally applicable to the coil springs 114a, 114b.

The method of heating each actuator member 21-23 should not be limited to the method of applying the electric current to the metal plating formed at the surface of the actuator member 21-23, and another appropriate method may be used to heat each actuator member 21-23. For example, a coil may be wound around an outer peripheral surface each actuator member 21-23, and the actuator member 21-23 may be heated by applying the electric current to the coil. Alternatively, a heat-generating heater may be used to heat each actuator member 21-23.

Each actuator member 21, 22 should not be limited to the member that is torsionally deformed in response to the application of the energy. Alternatively, a member, which is linearly displaced in the longitudinal direction in response to application of energy, may be used. For example, an actuator member, which is expandable in a direction parallel to the axis m1 in response to heating and is contractible in the direction parallel to the axis m1 in response to cooling, may be used as each actuator member 21, 22.

The material of each actuator member 21-23 should not be limited to the polymer fibers. Alternative to the polymer fibers, there may be used another appropriate material, which is deformable in response to an input of energy from an outside by an electrical means, an optical means, a chemical means, a thermal means, an absorbing means or another means. This type of material may be, for example, a shape memory alloy, a dielectric elastomer, a magnetic gel, or an electrically conductive polymer.

Any appropriate material, which is deformable in response to the energy input from the outside, may be used as the material of the correcting actuator member 23 of the modification of the first embodiment. The material of the correcting actuator member 23 may be the same as or different from the material of the first actuator member 21. In the case where the material of the correcting actuator member 23 is the same as the material of the first actuator member 21, the correcting actuator member 23 and the first actuator member 21 may be formed together in one piece.

The means and/or functions provided by the controller 70 may be provided by a software stored in a tangible storage device and a computer executing the software, or the software alone, or the hardware alone, or a combination thereof. For example, in the case where the controller 70 is implemented by an electronic circuit, which is the hardware, this electronic circuit may be implemented by a digital circuit including a plurality of logic circuits, or an analog circuit.

The present disclosure should not be limited to the above-described specific examples. Modifications, which can be appropriately design modified by a person skilled in the art, may be also included in the scope of the present disclosure as long as they have the feature(s) of the present disclosure. The elements, the arrangement of the elements, the conditions, the shapes, and the like of each specific example described above are not necessarily limited to those exemplified and can be appropriately changed. A combination of the respective elements included in each of the above-described specific examples can be appropriately changed as long as no technical inconsistency exists.

The invention claimed is:

1. An actuator device comprising:
 a deformable actuator member that is made of polymer fiber and is configured to be deformed in response to application of energy to the deformable actuator member from an outside of the deformable actuator member;
 a drive subject that is coupled to the deformable actuator member;
 a drive device that is configured to apply the energy to the deformable actuator member and thereby displace the drive subject in a deforming direction of the deformable actuator member; and
 a tension applicator that is configured to apply the deformable actuator member a tension, which enables correction of a tension change generated by at least one of elongation and contraction of the deformable actuator member that is induced by natural deformation of the deformable actuator member, wherein:
 the tension applicator includes:
  a correcting actuator member that is made of a material, which is the same as a material of the deformable actuator member, wherein the correcting actuator member is coupled to an end part of the deformable actuator member, and in response to application of energy to the correcting actuator member from an outside of the correcting actuator member, the correcting actuator member applies the deformable actuator member the tension, which enables the correction of the tension change generated by the at least one of the elongation and the contraction of the deformable actuator member induced by the natural deformation of the deformable actuator member; and
  a correcting drive device that is configured to apply the energy to the correcting actuator member.

2. An actuator device comprising:
 a deformable actuator member that is configured to be deformed in response to application of energy to the deformable actuator member from an outside of the deformable actuator member;
 a drive subject that is coupled to the deformable actuator member;
 a drive device that is configured to apply the energy to the deformable actuator member and thereby displace the drive subject in a deforming direction of the deformable actuator member; and
 a tension applicator that is configured to apply the deformable actuator member a tension, which enables correction of a tension change generated by at least one of elongation and contraction of the deformable actuator member that is induced by natural deformation of the deformable actuator member, wherein:
 the tension applicator includes:
  a correcting actuator member that is made of a material, which is the same as a material of the deformable actuator member, wherein the correcting actuator member is coupled to an end part of the deformable actuator member, and in response to application of energy to the correcting actuator member from an outside of the correcting actuator member, the correcting actuator member applies the deformable actuator member the tension, which enables the correction of the tension change generated by the at least one of the elongation and the contraction of the deformable actuator member induced by the natural deformation of the deformable actuator member; and a correcting drive device that is configured to apply the energy to the correcting actuator member; and the deformable actuator member includes a first deformable actuator member and a second deformable actuator member, and the drive subject is disposed in between the first deformable actuator member and the second deformable actuator member.

\* \* \* \* \*